(No Model.)  2 Sheets—Sheet 2.
W. G. HERBERT.
ENDLESS BELT BUCKET ELEVATOR.
No. 358,551. Patented Mar. 1, 1887.
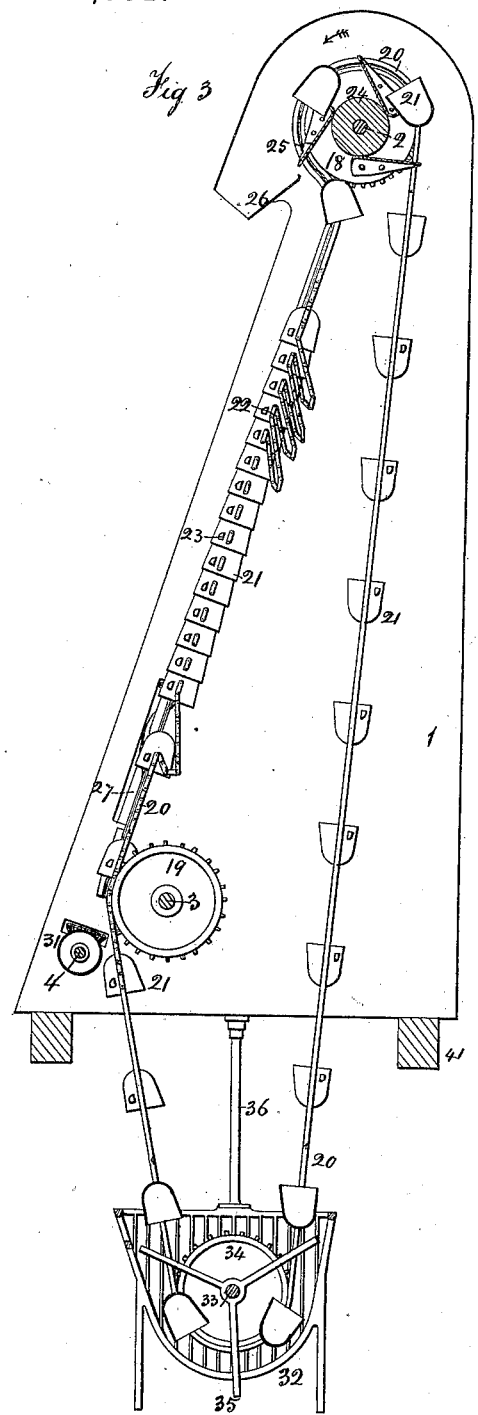
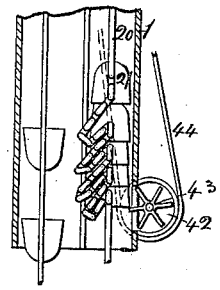
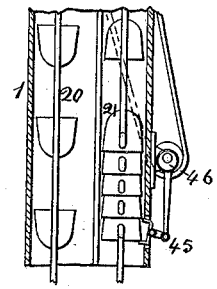
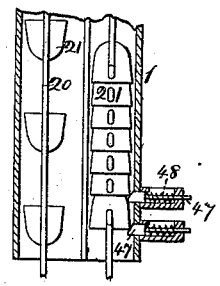
Witnesses
Inventor
William Green Herbert

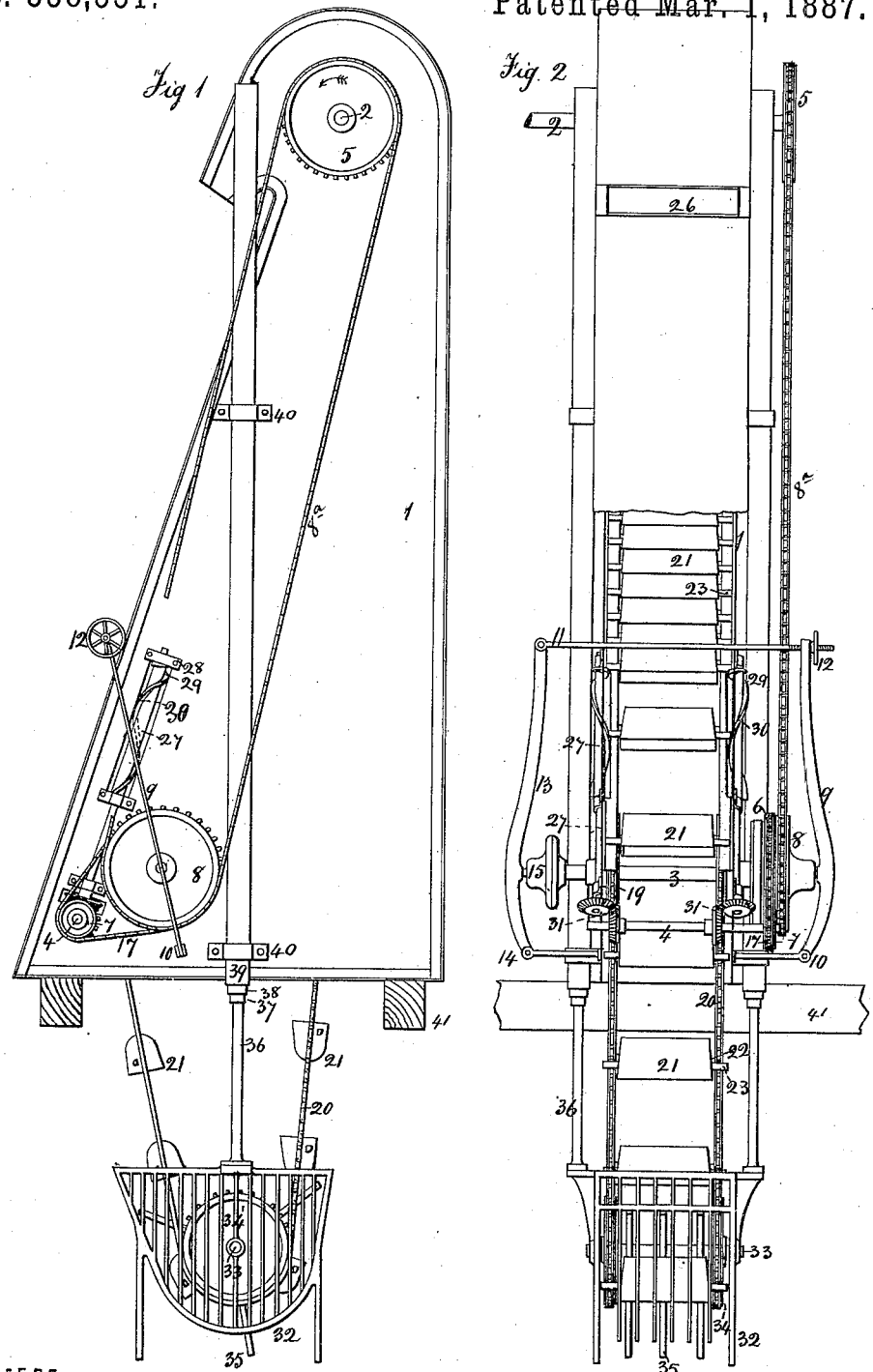

UNITED STATES PATENT OFFICE.

WILLIAM GREEN HERBERT, OF LIVERPOOL, COUNTY OF LANCASTER, ENGLAND.

ENDLESS-BELT BUCKET-ELEVATOR.

SPECIFICATION forming part of Letters Patent No. 358,551, dated March 1, 1887.

Application filed August 30, 1886. Serial No. 212,149. (No model.) Patented in England January 4, 1884, No. 639.

*To all whom it may concern:*

Be it known that I, WILLIAM GREEN HERBERT, a subject of the Queen of Great Britain, residing at Liverpool, in the county of Lancaster, England, have invented a new and useful Endless-Belt Bucket-Elevator, (for which I have obtained a patent in Great Britain, No. 639, January 4, 1884, and nowhere else,) of which the following is a specification.

My invention relates to elevators in which a series of buckets are attached to endless chains and are caused to travel continuously from grain, salt, sand, small coal, or other granular or finely-divided substance to be elevated to the point of delivery.

The main object is to provide an elevator capable of being easily extended or shortened, so as to allow of economical use under varying conditions and possessing the advantages of being compact and light, thereby requiring reduced power for the work done.

A further object is to enable a bucket-elevator to readily collect the substances to be elevated, and to deliver them with little or no loss at whatever speed it may be moving.

The invention is carried into effect, mainly, by so constructing an elevator that after the buckets have ascended full of the substance to be elevated and have delivered their contents they are retarded on their downward travel and fitted or collected one on another until again required to be filled.

Figure 1 is a side elevation, Fig. 2 is a front elevation, and Fig. 3 a vertical section, of my improved elevator. Figs. 4, 5, and 6 are detail views illustrating modified forms of apparatus for retarding the descent of the buckets.

A metal frame, 1, carries three cross-shafts, 2, 3, and 4, one near the top and the other two near the bottom, so disposed that when the frame rests on its base the lower shafts are (for the purpose of allowing the chains carrying the buckets to form loops, as shown) in advance of the upper shafts. On these shafts are secured chain-wheels 5, 6, and 7. On the shaft 3 there is also a loose chain-wheel, 8, capable of being made to grip the chain-wheel 6 by means of friction.

The necessary friction is obtained by pressing the wheel 8 against the wheel 6 by means of the lever 9, pivoted at 10. The lever 9 is caused to bear more or less against the boss of the wheel 8 by means of the screwed tie-rod 11 and nut 12.

The tie-rod 11 is connected to a lever, 13, pivoted at 14, and arranged to bear against the loose cap 15 on the shaft 3. By this arrangement end-thrust on the shaft 3 is avoided.

It will be evident that any usual friction-clutch arrangement might be used for causing the loose wheel 8 and wheel 6 and shaft 3 to rotate together.

17 is a chain gearing the wheels 6 and 7 together.

The wheels 5 and 8 are geared together by endless chain $8^a$.

On the shafts 2 and 3 are chain-wheels 18 19, which carry the endless chains 20. The said chains 20 are attached to the buckets 21 by means of pins passing through the links 22, or the links 22 may be cast or formed with the buckets, and lengths of chain used to connect such links from bucket to bucket.

23 are guide-pieces, cast or riveted or otherwise secured to the buckets. These also serve to rest on the helical feathers 29 30.

The buckets are made in any usual way, or they may be made advantageously with cast ends riveted to sheet-metal sides. On the shaft 2 is secured a roller, 24, carrying aprons 25. The aprons 25 are in number equal to the number of buckets which pass the wheels 18 at each revolution, and the said aprons are so disposed that as each bucket is discharging its contents down the chute 26 on the frame 1 they form a continuation of the said chute. By this means the grain or substance being elevated cannot miss the chute.

27 are shafts carried in bearings 28 on the frame 1, and provided each with a helical feather, 29 30. The shafts 27 are geared to the shaft 4 by miter-wheels 31. In the apparatus shown there are three aprons on the shaft 2, and the wheels 18 19 are of such diameter that three buckets pass at each revolution. The chain-wheels 5 6 8 are of equal diameters, and the chain-wheel 7 is of one-third the diameter of 5. The miter-wheels 31 are of equal diameter, and each portion 29 30 of the helical feather makes a complete revolution, the pitch of 29 being equal to the distance between the buckets when they are piled on one another, or thereabout, and the pitch of 30 being equal to the distance from the leading edge of one bucket to the leading edge of the next, when they are then full distance apart.

32 is a cage of cast or wrought metal bars, or other suitable material, and carried in bearings on the cage is a cross-shaft, 33, having secured thereon chain-wheels 34 and arms 35, which project between the bars of the cage. When the shaft 33 is caused to rotate these arms enter into and among the substance to be elevated, so as to agitate it and cause it to freely pass between the bars of the cage and enter the buckets. The number of arms on the shaft 33 corresponds to the number of buckets which pass the wheels 34 at each revolution. In the apparatus shown there are three arms, and the diameters of the wheels are such that three buckets pass at each revolution. The arms should be so shaped as to force any obstruction away from the cage. The lower parts of the endless chains 20 pass round the wheels 34. Guide-rods 36 are attached to the cage 32, and fit within sleeves 37, which in turn fit in sleeves 38 39, the latter passing through bearings 40 on the frame 1.

It will be evident that any other form of telescopic connection might be used between the upper and lower parts of the elevator—such as lazy-tongs—and that the diameters of the wheels and proportions of the parts of the apparatus may be altered to adapt them to various conditions.

41 represents any convenient carriers—such as spars over a hatching for supporting the apparatus. A driving-wheel (not shown) is attached to one end of the shaft 2.

The elevator is used as follows: It is placed on carriers—such as 41—and is secured in position by guy-ropes, struts, or other suitable agents. A driving-band from a deck-winch or other convenient motor is passed round the driving-wheel on the shaft 2, or a motor may be geared thereto in any convenient manner. The nut 12 is slacked off and the wheel 7 and shafts 3 and 4 and 27 are left free to revolve. The weight of the cage 32 and connection on the chains 20 causes the wheel 19 to revolve, and also the shafts 27, so that buckets pass from the pile above down the helical feathers 29, and the chains lengthen out until the cage reaches the grain or material to be elevated. The nut 12 is then tightened, the shaft 2 is caused to revolve in the direction of the arrow, and motion is given to the chains and buckets. For each bucket raised and deposited on the pile a bucket passes down the helical feathers of the shafts 27. The arms 35 stir the grain, salt, or other substance beneath the cage and allow it to enter easily between the bars and find its way into the buckets. As the work proceeds the nut 12 is occasionally slacked, and the cage allowed to descend by reason of the shafts 27 being free to revolve, and to pass buckets from the pile faster than they are deposited thereon, and by having the feathers 29 30 of two pitches, each a complete revolution, there are always two buckets engaged therewith, and any irregularity of action is obviated. When the chains are fully extended, extra lengths of chain and buckets may be added, if required, by uncoupling the chains at any convenient place. It is advantageous to have a ratchet-wheel and pawl on the shaft 2 to prevent reverse motion.

The main feature of novelty in my invention is constructing the elevator in such manner that the elevator may be extended or shortened by means of increasing or retarding the speed of travel of the buckets on the descending side above or below that of the buckets on the ascending side; and as this result may be obtained by numerous devices as well as by the shafts 27 and feathers 29 30, I have shown in Figs. 4, 5, and 6 details of three modifications of apparatus for retarding the travel of the buckets at the required times. In Fig. 4 a star-wheel, 42, on a shaft, 43, in bearings on the frame 1, is driven by the belt 44, and is used instead of the helical feather to retard the travel of the buckets. In Fig. 5 an escapement or rocking lever, 45, actuated by an eccentric, 46, is used instead of the helical feather.

In both of the above examples friction-clutches or equivalent means must be used to regulate the speed of the retarding apparatus.

In Fig. 6 two catch-plates, 47, held in position by springs 48, are used. The plates are caused to move and release a bucket by the strain on the chain beneath them.

The retarding appliances may be carried by the lower frame or cage, 32, instead of the upper frame, 1, the gearing being altered to the lower shaft, 33, accordingly. In this case a friction-clutch or its equivalent is not required.

I claim—

1. The combination of elevator-buckets arranged on an endless chain with devices, substantially as described, for retarding the buckets, substantially as and for the purposes specified.

2. The combination of elevator-buckets arranged on an endless chain with rotary helical shafts arranged in the path of the buckets for retarding them, substantially as and for the purposes described.

3. The combination, with the endless chain of an elevator-bucket system, of an extensible lower sheave or drum around which the chain passes, said chain being of greater length than the normal distance between the upper sheave and the lower sheave to permit extension of the latter, and devices, substantially as described, for retarding the passage of the buckets from one sheave to the other, substantially as and for the purposes specified.

4. The combination, with the endless chain of an elevator-bucket system, of sheaves or drums around which the chain passes, said chain being of greater length than the normal distance between the sheaves, and arranged for a portion of its length in an inclined position, and devices, substantially as described, for retarding the buckets, substantially as and for the purposes described.

5. The combination, with the endless chain of an elevator-bucket system, of the driven sheave 18 and extensible sheave 34, bucket-retarding devices, substantially as described, and mechanical devices connecting the sheave 18 with the bucket-retarding devices for the purpose of operating them to permit the advance of the bucket, substantially as and for the purpose described.

6. The combination, with an endless-chain bucket system, of an open cage, 32, through which the buckets pass, substantially as and for the purposes described.

7. In combination with an endless-chain bucket system, an open cage, 32, through which the buckets pass, and a rotary shaft, 33, within said cage, having agitating arms which draw into the cage the material to be lifted and bring it in the path of the buckets, substantially as and for the purposes described.

WILLIAM GREEN HERBERT.

Witnesses:
JAS. SEDDON,
JAMES JOHNSON.